J. GEISSLINGER.
DYNAMO ELECTRIC MACHINE.
APPLICATION FILED JUNE 17, 1913.
1,210,639.
Patented Jan. 2, 1917.
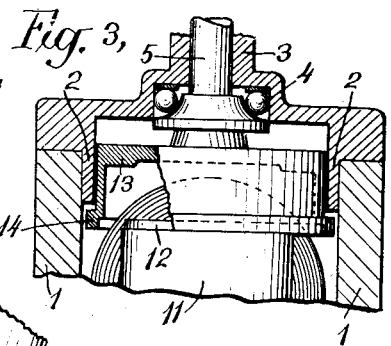
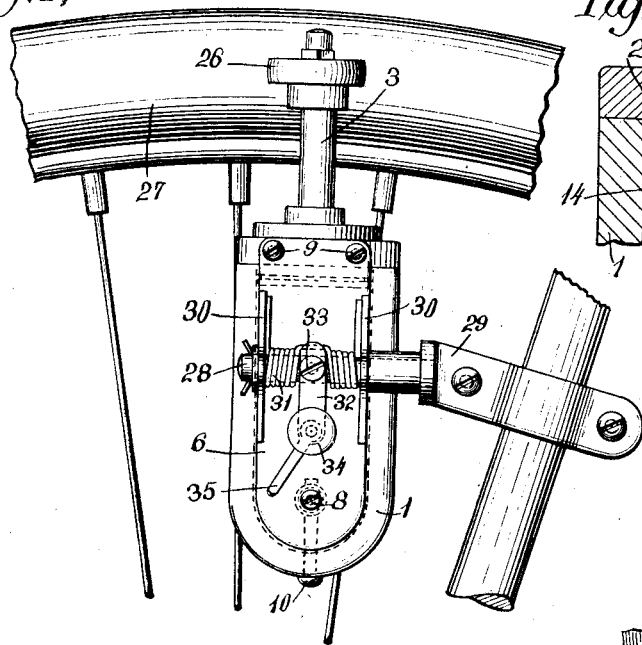
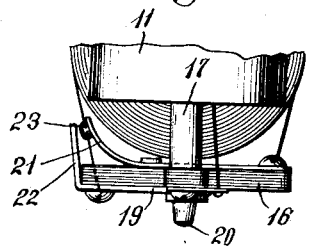
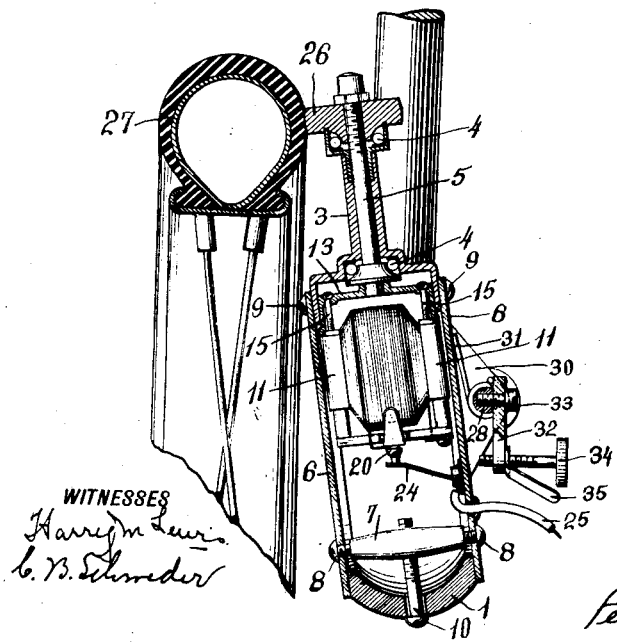
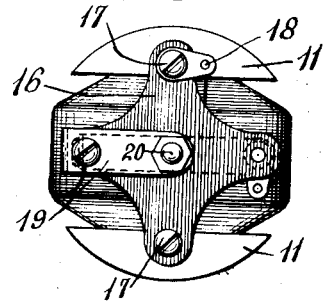
INVENTOR
Johann Geisslinger
BY
Pennie Davis & Goldsbrough
ATTORNEYS

UNITED STATES PATENT OFFICE.

JOHANN GEISSLINGER, OF GENEVA, SWITZERLAND, ASSIGNOR, BY DIRECT AND MESNE ASSIGNMENTS, OF ONE-HALF TO FABRIQUE INTERNATIONALE D'APPAREILS À MAGNETO S. A. (F. I. A. M.), OF GENEVA-ACACIAS, SWITZERLAND, AND ONE-HALF TO MARBURG BROTHERS, OF NEW YORK, N. Y., A CORPORATION.

DYNAMO-ELECTRIC MACHINE.

1,210,639.      Specification of Letters Patent.      Patented Jan. 2, 1917.

Application filed June 17, 1913. Serial No. 774,153.

*To all whom it may concern:*

Be it known that I, JOHANN GEISSLINGER, a subject of the Emperor of Germany, residing at Geneva, Canton of Geneva, in the Confederation of Switzerland, have invented certain new and useful Improvements in Dynamo-Electric Machines; and I do hereby declare the following to be a full, clear, and exact description of the invention, such as will enable others skilled in the art to which it apppertain to make and use the same.

The present invention relates to dynamo electric machines, and particularly to a type of magneto electric generator well adapted for lighting electric lamps, wherein the generator is of simple and sturdy construction, is reliable in operation with but little attention, and is provided with a novel form of suspension for supporting it in frictional driving engagement with the tire of a motorcycle or the like, the arrangement being such that the generator may be readily disassembled at will for inspection and repair.

A magneto electric generator of this general type is shown in my co-pending application, Serial No. 699,099, filed May 23, 1912, but the generator of this application embodies several improvements thereon relating especially to the bearing for overhanging the armature within the magnet and between the poles thereof, to the means for maintaining a substantially constant terminal voltage irrespective of the driving speed, and to a bracket support such that the vibration of the generator is reduced to a minimum even when the driving wheel does not run true in its rotation.

In the accompanying drawing, illustrating my invention in application to a motorcycle, as an example, Figure 1 represents a vertical elevation of the generator supported from the frame of the cycle in frictional driving engagement with the tire; Fig. 2 represents an elevational section at right-angles to Fig. 1; Fig. 3 represents an enlarged view particularly showing a part of the bearing for overhanging the armature, and Figs. 4 and 5 represent enlarged views of the unsupported end of the armature, particularly showing the electrical connections of the armature winding.

The generator is of the magneto type having a permanent field magnet 1, with a cylindrical-shaped inner face having its axis of curvature along the length of the arms of the magnet. The outer face of the magnet is similarly curved but has flat surfaces adjacent the open spaces between the arms.

The overhanging bearing member is of non-magnetic metal and has a circular flange 2 closely fitting within the inner surface of the magnet arms, while the end of the bearing member abuts against the ends of the magnet arms to form an end closure for the magnet, as is best shown in Fig. 3. This bearing member has an extended tubular portion 3 and is provided with ball bearings 4 separated as far as possible from each other along the armature shaft 5. The bearing member is supported from the magnet by the plates 6 of non-magnetic metal, which are seated on the flat outer surfaces of the magnet and are fastened to the transverse support 7 by the screws 8 and to the bearing by the screws 9, the transverse support being fastened to the magnet by the screw 10. The armature is of the shuttle-wound type having an H-shaped core with the pole pieces 11 adapted to rotate with a small air gap within the magnet between the poles thereof. The pole pieces have a circumferential ledge 12 at their ends adjacent the bearing, and the cap 13 of non-magnetic metal is provided with a coöperating circumferential offset 14 adapted to fit the eldge to thereby center the cap relatively to the axis of the armature. (See Figs. 2 and 3). The cap is held in position on the armature core by the screws 15. The armature shaft 5 is fastened to the center of the cap and extends through the bearing, the arrangement being such that the armature is overhung within the magnet in centered position between the poles thereof, while the bearing is rigidly supported from the magnet by the side plates 6. The insulating member 16 is supported on the unsupported end of the armature by two posts 17 of electrical conducting material, and fastened to the ends of the pole pieces 11. (See Figs. 4 and 5). The terminal 18 of the armature winding is connected to one of the posts 17 and is therefore grounded on the armature core, while the other terminal of the armature winding is electrically connected by the metal strip 19 to the conducting button 20 which is arranged on the axis of rotation of the armature.

An intermediate point of the armature winding is electrically connected to the weighted arm 21 of a centrifugal switch, while the other side 22 of the switch leads to the button 20. The arm 21 carries a conducting button 23 which comes into electrical contact with the metal strip 22 at a predetermined speed of rotation of the armature, and thereby short circuits the portion of the armature winding connected between the intermediate terminal and that terminal which is connected to the button 20. At higher speeds the button 23 wipes on the strip 22 and keeps a bright surface of contact between them. As the driving speed of the armature increases, the voltage generated by the winding increases, but at the same time the inductance increases at the same rate. The terminal voltage of the magneto would be maintained at a substantially constant value without any regulating expedient at all, if the electric lamp or other translating device supplied with current by the generator were purely inductive in character. However, since an incandescent lamp has practically no inductance, the impedance of the circuit of the magneto does not rise at the same rate as the driving speed. Thus when the terminal voltage of the magneto reaches a predetermined high value, the centrifugal switch 21, 22 is designed to close so as to short circuit a part of the generator winding and also so as to weaken the field as a result of the reaction of the ampere-turns in the short circuited part of the armature winding, thereby reducing the terminal voltage of the magnet to a sufficiently low value as will not in practical operation be increased by further rising speed to any excessive value. It has been found in practice that this arrangement is well suited for lighting lamps on motor-cycles and like vehicles in this way. The brush 24 is arranged in sliding engagement with the button 20, and the conductor 25 leads the current produced in the armature winding to the outside, for example to an incandescent lamp to be lighted.

The magneto is supported from the frame of the cycle in such manner that the friction roller 26, which is mounted on the outer end of the armature shaft 5, is maintained continually in driving engagement with the tire of the wheel 27 without material vibration of the magneto. This result is attained by providing the bearing pin 28 of the bracket clamp 29 substantially parallel to the plane of rotation of the driving wheel, but substantially at right-angles to the radius thereof, and also by supporting the magneto on this bearing pin in a plane which passes substantially through the center of gravity of the magneto. Thus when the wheel 27 does not run true in its rotation, the magneto oscillates through but a small angle, while the moments on the two sides of the bearing pin are substantially equal, thus reducing the angle through which the magneto oscillates and the inertia effects to small values. The bearings for the bearing pin 28 is formed in the two flanges 30 on one of the side plates 6 near the center of the magnet arms. The spring 31 is wound around the bearing pin 28 with its outer ends pressing against the side plate 6 and its center held by one end of the member 32 which is fastened by the screw 33 to the bearing pin. The other end of the member 32 carries an adjustable thumb screw 34 and a locking member 35 therefor, the arrangement being such that while the bearing pin is held rigidly in position by the clamp 29, the magneto is allowed to be turned by the spring 31 only through the angle at which the end of the adjustable screw 34 comes into contact with the side plate 6. In the other direction of oscillation, the wheel 27 turns the magneto on the bearing pin against the stress of the spring. It has been found in practical operation that the magneto swings but through a small angle and but with little vibration.

The magneto may be readily disassembled for inspection and repair, simply by removing the screws 8 and then pulling the magnet 1 away from the bearing and the plate 6, the armature and its connections then being exposed. The manner of taking the remaining equipment apart will be apparent from the drawings and foregoing description.

When it is desired to hold the friction roller 26 out of driving engagement with the tire, as, for instance, during the day time when the use of the lamp is not required, the adjustable set screw 34 may be given the requisite number of turns to swing the friction roller 26 clear of the tire, whereupon it will be held out of driving engagement therewith.

Having thus described my invention, what I claim is:

1. In a magneto electric generator, a permanent field magnet of the horse-shoe type, a rotatable armature having its axis positioned along the length of the magnet arms, an armature shaft extending in a single direction from the armature, an extended bearing member for the shaft abutting the outer ends of the magnet arms and being provided with ball bearings which are widely separated along the armature shaft so as to rigidly overhang the armature within the magnet between the poles thereof, means for supporting the bearing member from the magnet, and means on the outer end of the armature shaft whereby the armature may be rotated; substantially as described.

2. In a magneto electric generator, a permanent field magnet of the horse-shoe type, a rotatable shuttle-wound armature, a cap fastened to the armature core and being internally recessed to provide for the entrance thereinto of the ends of the armature coil, an armature shaft fastened to the cap, a bearing member for the shaft attached to the magnet so as to position the armature within the magnet between the poles thereof, and means on the shaft whereby the armature may be rotated; substantially as described.

3. In a magneto electric generator, a permanent field magnet of the horse shoe type, a rotatable shuttle-wound armature having a circular ledge on the ends of the pole pieces, a cap having a circumferential offset coöperative with said ledge and being internally recessed to provide for the entrance thereinto of the ends of the armature coils, an armature shaft fastened to the cap, a bearing member for the shaft attached to the magnet so as to position the armature within the magnet between the poles thereof, and means on the shaft whereby the armature may be rotated; substantially as described.

4. In a magneto electric generator, a permanent field magnet of the horse-shoe type, a rotatable shuttle-wound armature, a bearing member which is attached to the magnet and which entirely supports the armature in overhung position between the poles of the magnet, an insulating member located at the unsupported end of the armature and fastened to the pole pieces thereof, a conducting button carried by the insulating member, a stationary brush in sliding engagement with the button, and means whereby the armature may be rotated, one terminal of the armature winding being grounded, and the other terminal of the armature winding being electrically connected to the conducting button to connect the armature winding to the outside; substantially as described.

5. In a magneto electric generator, a permanent field magnet of the horse-shoe type, a rotatable shuttle-wound armature, a bearing member which is attached to the magnet and which entirely supports the armature in overhung position between the poles of the magnet, an insulating member located at the unsupported end of the armature, a conducting support for fastening the insulating member to the pole pieces of the armature, a conducting button carried by the insulating member, a stationary brush in sliding engagement with the button, and means whereby the armature may be rotated, one terminal of the armature winding being electrically connected to the conducting support and therethrough to the armature core to ground the armature winding, and the other terminal of the armature winding being electrically connected to the conducting button to connect the armature winding to the outside, substantially as described.

6. In a magneto electric generator, a permanent field magnet of the horse-shoe type, a rotatable shuttle-wound armature, a bearing member which is attached to the magnet and which entirely supports the armature in overhung position between the poles of the magnet, an insulating member located at the unsupported end of the armature and fastened to the pole pieces thereof, a conducting button carried by the insulating member, a stationary brush in sliding engagement with the button, and means whereby the armature may be rotated, one terminal of the armature winding being grounded, the other terminal of the armature winding being electrically connected to the conducting button to connect the armature winding to the outside, and an intermediate point of the armature winding being electrically connected to the conducting button through a switch; substantially as described.

7. In a magneto electric generator, a permanent field magnet of the horse-shoe type, a rotatable shuttle wound armature, a bearing member which is attached to the magnet and which entirely supports the armature in overhung position between the poles of the magnet, an insulating member located at the unsupported end of the armature, a conducting support fastening the insulating member to the pole pieces of the armature, a conducting button carried by the insulating member, a stationary brush in sliding engagement with the button, and means whereby the armature may be rotated, one terminal of the armature winding being electrically connected to the conducting support and therethrough to the armature core to ground the armature winding thereon, the other terminal of the armature winding being electrically connected to the conducting button to connect the armature winding to the outside, and an intermediate point of the armature winding being electrically connected to the conducting button through a switch; substantially as described.

8. The combination with a cycle wheel, of a generator adapted to be driven thereby and comprising a field magnet of the horse shoe type, an armature supported between the poles thereof and having driving means engageable with the wheel, a plate forming a closure for the space between the arms of the magnet and having bearings, a bracket adapted to be attached to a stationary part of the cycle and having a bearing pin supported in said bearings, and a spring tending to hold the driving means on the armature shaft in engagement with the cycle wheel; substantially as described.

9. The combination with a cycle wheel, of a generator adapted to be driven thereby, and comprising a field magnet of the horse shoe type, an armature supported between the poles thereof and having driving means engageable with the wheel, a plate forming a closure for the space between the arms of the magnet and having bearings, a bracket adapted to be attached to a stationary part of the cycle and having a bearing pin supported in said bearings, a member fastened to the bearing pin, a spring acting between said member and said plate to hold the driving means on the armature shaft in engagement with the cycle wheel, and an adjustable screw engaging said member and adapted to turn the generator on the bearing pin against the stress of the spring to hold the driving means on the armature shaft out of engagement with the wheel.

In testimony whereof I affix my signature.

JOHANN GEISSLINGER.

---

Correction in Letters Patent No. 1,210,639.

It is hereby certified that in Letters Patent No. 1,210,639, granted January 2, 1917, upon the application of Johann Geisslinger, of Geneva, Switzerland, for an improvement in "Dynamo-Electric Machines," an error appears in the printed specification requiring correction as follows: Page 1, line 86, for the word "eldge" read *ledge;* and that the said Letters Patent should be read with this correction therein that the same may conform to the record of the case in the Patent Office.

Signed and sealed this 6th day of February, A. D., 1917.

[SEAL.]

R. F. WHITEHEAD,
*Acting Commissioner of Patents.*

Cl. 171—209.